United States Patent
Nakajima et al.

[11] Patent Number: 5,789,109
[45] Date of Patent: Aug. 4, 1998

[54] CATHODE COMPOSITE

[75] Inventors: Yasumasa Nakajima; Syuichi Izuchi; Hiroshi Imachi; Hiroyuki Fukutome, all of Takatsuki, Japan

[73] Assignee: Yuasa Corporation, Osaka-fu, Japan

[21] Appl. No.: 417,986

[22] Filed: Apr. 6, 1995

Related U.S. Application Data

[62] Division of Ser. No. 70,379, Jun. 8, 1993, Pat. No. 5,443,927.

[30] Foreign Application Priority Data

Oct. 9, 1991 [JP] Japan ................................. 3-290511

[51] Int. Cl.$^6$ ............................................................ H01M 4/62
[52] U.S. Cl. ............................ 429/215; 429/212; 252/182.1
[58] Field of Search ................................ 429/215, 212; 252/182.1

[56] References Cited

U.S. PATENT DOCUMENTS

| | | | |
|---|---|---|---|
| 3,057,944 | 10/1962 | Ruetsch et al. | 429/212 |
| 4,146,685 | 3/1979 | Tucholski | 252/182.1 X |
| 4,195,121 | 3/1980 | Peterson | 252/182.1 X |
| 4,278,745 | 7/1981 | Skarstad et al. | 429/213 |
| 4,317,874 | 3/1982 | Joshi et al. | 429/213 |
| 4,340,651 | 7/1982 | Howard et al. | 429/213 X |
| 4,601,919 | 7/1986 | Asami et al. | 429/217 X |
| 4,655,885 | 4/1987 | Hiu et al. | 429/213 X |
| 4,791,037 | 12/1988 | Anderman | 429/217 X |

*Primary Examiner*—John S. Maples
*Attorney, Agent, or Firm*—Evenson, McKeown, Edwards & Lenahan, P.L.L.C.

[57] ABSTRACT

This invention relates to a cathode composite for use in a primary battery and a secondary battery. In order to uniformly disperse a positive active material and a conductive agent in the cathode composite, wherein the cathode composite comprises a polar organic molecule, a chalcogen containing positive active compound, a conductive agent and a diluent, wherein the polar organic molecule has at least one acid structure based on phosphoric acid, sulfonic acid, boric acid, carboxylic acid or sulfuric acid and functions as a dispersant.

2 Claims, 2 Drawing Sheets

5,789,109

1

CATHODE COMPOSITE

This is a Divisional of application Ser. No. 08/070,379, filed Jun. 8, 1993, now U.S. Pat. No. 5,443,927.

TECHNICAL FIELD

This invention relates to a cathode composite for use in a primary battery and a secondary battery.

BACKGROUND ART

As a lithium battery, for example, there are primary battery and a secondary battery, in which chalcogen compound is used for a positive active material and metallic lithium is used for an anode. This type of battery has generally been composed a cathode including a cathode composite, an anode including metallic lithium forming the negative active material, and a separator. This type of battery has been formed by laying the cathode on the anode through the separator and by housing this laminate in a battery can or filling its peripheral edge with a sealing agent. Particles of positive active material, particles of carbon such as carbon black forming a conductive agent, polytetrafluoroethylene or solid polymer electrolyte serving as a binder and organic solvent serving as a diluent have been mixed to be formed into a paste and filled in or applied onto a substrate such as a stainless steel net or stainless steel plate, thus the cathode composite in the cathode has been formed. The anode has been formed by sticking a metallic lithium sheet onto the stainless steel plate or composed of the metallic lithium sheet only.

However, the cathode composite has included the following problems. When mixing the above materials to form into the paste, the positive active material and the conductive agent have cohered so as to worsen wetting of them with the binder and organic solvent. For this reason, uniform mixing has been difficult, uniform application on the substrate has also been difficult, and further a surface of the prepared cathode composite has not become uniform but formed into a corrugated shape. Therefore, the positive active material, the conductive agent and the binder have not been dispersed uniformly in the above-mentioned cathode composite, so that the cathode composite has sometimes been cracked or peeled off from the substrate. In addition, an initial capacity has been small as compared with a theoretical capacity in the primary battery using the above cathode composite, and a capacity has lowered to a value smaller than a half of the initial capacity at 100 cycles in the secondary battery. Further, in the battery using the above cathode composite, convex portions of surface have sometimes broken the separator to reach the anode so as to cause a short-circuiting.

This invention is made in order to solve the foregoing problems, and an object of this invention is to provide a cathode composite, in which a cracking, a peeling-off from a substrate and a short-circuiting can be prevented, a good discharge characteristic can be exercised when used in a primary battery, and a good charge/discharge characteristic can be exercised when used in a secondary battery.

DISCLOSURE OF THE INVENTION

The cathode composite of this invention includes a compound including heteroatoms in its molecular structure which will become a polar molecule, and functioning as a dispersant.

Atoms of nitrogen, oxygen, phosphorus, sulfur and boron etc. may be mentioned as the heteroatom. When these heteroatoms are combined in an end portion, for example, of the molecular structure, a bias will be produced in the entire electron cloud in the above compound so that this compound will become the polar molecule.

The function as a dispersant means a function for preventing particles of solid from cohering or precipitating in liquid.

In this invention, the compound is adsorbed to surfaces of the positive active material and the conductive agent and sterically stabilized, so as to prevent the positive active material and the conductive agent from cohering and improve wetting of the positive active material and the conductive agent to the organic solvent and the binder. For this reason, the positive active material, the conductive agent and the binder are dispersed uniformly so that these can be mixed uniformly and can be applied on the substrate evenly. In addition, a cathode composite having an uniform and not-corrugated surf ace can be obtained. Accordingly, the cracking, the peeling-off from the substrate and the short-circuiting can be prevented. Further, a good discharge characteristic can be exercised when the cathode composite is used for the primary battery, and a good charge/discharge characteristic can be exercised when it is used for the secondary battery.

When the above compound includes an acid structure, a discharge characteristic after a long-term preservation is made favorable by converting the part of acid structure into a salt which is inactive to lithium forming a negative active material.

Structures based on phosphoric acid, sulfonic acid, boric acid, carboxylic acid and sulfuric acid etc., for example, may be mentioned as the above acid structure.

When the above compound includes a reactive ethylene bonding, the discharge characteristic after a long-term preservation is made favorable by bridging it with the binder.

Bondings of acrylic group and methacrylic group etc., for example, may be mentioned as the reactive ethylene bonding.

As the positive active material for use in the cathode composite of this invention; $MnO_2$ may be mentioned for the primary battery and $MoO_3$, $V_2O_5$, $V_6O_{13}$, $LiV_3O_8$, $LiMn_2O_4$, $LiCoO_2$, $LiCrO_2$ and $LiNiO_2$ etc. may be mentioned for the secondary battery.

BEST MODE FOR CARRYING OUT THE INVENTION (Embodiment 1)

15 weight parts of $MnO_2$ for serving as the positive active material for primary battery, 1.5 weight parts of acetylene black for serving as the conductive agent, 4 weight parts of electrolyte material for serving as the binder, 0.45 weight part of compound shown by a formula (I) for functioning as the dispersant, 8 weight parts of organic solvent formed by mixing cyclohexanone, methylethylketone and toluene for serving as the diluent and 0.08 weight part of azobisisobutyronitrile for serving as the reaction initiator, were mixed to prepare a paste of cathode composite. A mixture comprising monoacrylate of ethylene oxide, diacrylate of ethylene oxide and triacrylate of ethylene oxide were dissolved in propylene carbonate solution including lithium perchlorate with a concentration of 2 mol/l, so as to prepare the mentioned electrolyte material. Three kinds of acrylates forming the materials of the above mixture have molecular weights of about 200 respectively.

$$RNH_3X \qquad (I)$$

$$[R:C_nH_{2n+1}(n=8), X:Cl]$$

In the next place, the prepared paste was cast on a stainless steel substrate and left as it was for 1 hour at 100° C. in an atmosphere of inert gas so as to be cured, so that a sheet-shaped cathode composite was prepared on the stainless steel substrate. A thickness of the prepared cathode composite was 51 microns in average, 56 microns maximum and 47 microns minimum.

In the third place, 0.05 weight part of azobisisobutyronitrile were dissolved in 10 weight parts of the above electrolyte material, and this solution was cast on the cathode composite and cured in the same way as above, so that an electrolyte film was formed on the cathode composite. A thickness of the prepared electrolyte film was 20 microns.

Figure 1:
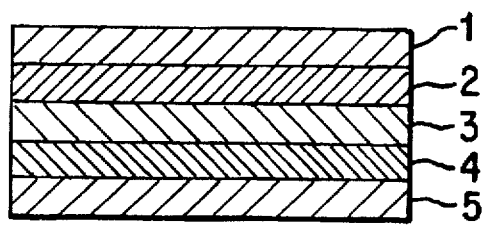
FIG. 1 is a schematic vertical sectional view showing a structure of batteries of embodiments 1 through 15.

A composite sheet thus prepared comprising the stainless steel substrate, the cathode composite and the electrolyte film was cut out into a piece of 1 cm by 1 cm square. Metallic lithium having a thickness of 100 microns was attached to the electrolyte film of this composite sheet for serving the anode so as to make up a battery having a structure shown in FIG. 1, that is, comprising a stainless steel substrate 1, a cathode composite 2, an electrolyte film 3, an anode 4 and a stainless steel substrate 5.

A load of 1 kg/cm² was applied on the prepared battery, and an initial discharge test was done under this condition at 25° C. with a constant current of 0.1 mA/cm². As a result, a cathode utilization factor of 80% was obtained. A filling rate of active material per volume of cathode composite was 30 volume percents.

In place of the compound shown in the formula (I), a compound may be used in which n is 9 through 16 in the formula (I) or X is other halogen atom. Further, a compound having a basic structure different from that of the formula (I) may be used, provided that the compound includes a nitrogen including group in the molecular structure which will become the polar molecule, and functions as the dispersant.

(Embodiment 2)

A battery was made up in the same way as the embodiment 1 except that a compound shown by a formula (II) functioning as the dispersant was used in place of the compound shown in the formula (I).

$$RCO(CH_2CH_2O)_mH \qquad (II)$$

$$[R:C_nH_{2n+1}(n=8), m=9]$$

A thickness of the cathode composite of the prepared battery was 53 microns in average, 57 microns maximum and 50 microns minimum.

The initial discharge test same with the embodiment 1 was done on the prepared battery, and a cathode utilization factor of 83% was obtained. A filling rate of active material per volume of cathode composite was 32 volume percents.

In place of the compound shown in the formula (II), a compound may be used in which n is 9 through 16 and m is 8 and 10 through 16 in the formula (II). Further, a compound having a basic structure different from that of the formula (II) may be used, provided that the compound includes an acyl group in the molecular structure which will become the polar molecule, and functions as the dispersant.

(Embodiments 3 through 9)

Batteries were made up in the same way as the embodiment 1 except that compounds shown by formulas (III) through (IX) functioning as the dispersant were used respectively in place of the compound shown by the formula (I). Thicknesses of the cathode composites, results of discharge test and filling rates of active material per volume of cathode composites are listed in Table 1 for respective prepared batteries.

[R: $C_nH_{2n+1}$ (n = 3), m = 8]

[R: $C_nH_{2n+1}$ (n = 3), m = 8]

[R: $C_nH_{2n+1}$ (n = 3)]

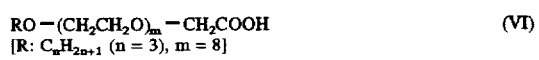

[R: $C_nH_{2n+1}$ (n = 3), m = 8]

[R: $C_nH_{2n+1}$ (n = 3)]

[R: $C_nH_{2n+1}$ (n = 3), m = 8]

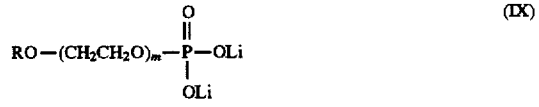

[R: $C_nH_{2n+1}$ (n = 3), m = 8]

TABLE 1

| Embodiment | Compound used as dispersant | Thickness of cathode composites (μm) | | | Discharge utilization factor (%) | | Filling rate of active material (vol %) |
|---|---|---|---|---|---|---|---|
| | | Average | Max. | Min. | Initial | After preservation of 40 days at 60° C. | |
| 1 | formula (III) | 55 | 56 | 54 | 85 | 50 | 36 |
| 4 | formula (IV) | 56 | 58 | 53 | 83 | — | 34 |
| 5 | formula (V) | 55 | 58 | 52 | 83 | — | 30 |
| 6 | formula (VI) | 54 | 55 | 52 | 83 | — | 32 |
| 7 | formula (VII) | 56 | 59 | 52 | 81 | — | 30 |
| 8 | formula (VIII) | 57 | 59 | 55 | 82 | — | 35 |
| 9 | formula (IX) | 55 | 56 | 53 | 87 | 52 | 36 |

In place of the compound shown in the formula (III), a compound may be used in which n is another integer and m is 1 through 7 and 9 through 80 in the formula (III). Further, in place of the compound shown in the formula (IV), a compound may be used in which n is another integer and m is 1 through 7 and 9 and through 30 in the formula (IV). Moreover, in place of the compound shown in the formula (V), a compound may be used in which n is another integer in the formula (V). Furthermore, in place of the compound shown in the formula (VI), a compound may be used in which n is another integer and m is 1 through 7 and 9 through 30 in the formula (VI). Still further, in place of the compound shown in the formula (VII), a compound may be used in which n is another integer in the formula (VII). Still further, in place of the compound shown in the formula (VIII), a compound may be used in which n is another integer and m is 1 through 7 and 9 through 30 in the formula (VIII). Still further, in place of the compound shown in the formula (IX), a compound may be used in which n is another integer and m is 1 through 7 and 9 through 80 in the formula (IX). Compounds having basic structures different from those of the formulas (III) through (IX) may be used, provided that the compounds include an acid structure in the molecular structure which will become the polar molecule and function as the dispersant. Structures based on phosphoric acid, sulfonic acid, boric acid, carboxylic acid and sulfuric acid etc., for example, may be mentioned as the acid structure.

(Embodiment 10)

A battery was made up in the same way as the embodiment 1 except that a compound shown by a formula (X) functioning as the dispersant was used in place of the compound shown by the formula (I). The compound shown in the formula (X) has a methacrylic group including a reactive ethylene bonding.

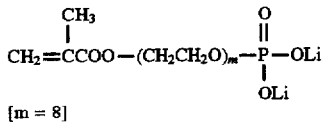

[m = 8]

A thickness of the cathode composite of the prepared battery was 53 microns in average, 54 microns maximum and 52 microns minimum.

The initial discharge test same with the embodiment 1 was done on the prepared battery, and a cathode utilization factor of 85% was obtained. In the discharge test after preservation of 40 days at 60° C., a cathode utilization factor of 60% was obtained. A filling rate of active material per volume of cathode composite was 36 volume percents.

In place of the compound shown in the formula (X), a compound may be used in which m is 1 through 7 and 9 through 80 in the formula (X). A compound may be used which has an acrylic group in place of the methacrylic group. Further, a compound having a basic structure different from that of the formula (X) may be used, provided that the compound includes a reactive ethylene bonding in the molecular structure which will become the polar molecule and functions as the dispersant.

(Embodiment 11)

A battery was made up in the same way as the embodiment 1 except that 0.75 weight part of compound (molecular weight: 10,000) shown in a formula (XI) functioning as the dispersant were used in place of the compound shown by the formula (I). 10 weight parts of benzene were used as the diluent. The compound shown in the formula (XI) was formed in such a way that polyethylene glycol was esterified by acrylic acid or methacrylic acid and phosphoric acid, and the obtained ester material was polymerized by reactive double bonding of the acrylic group or methacrylic group.

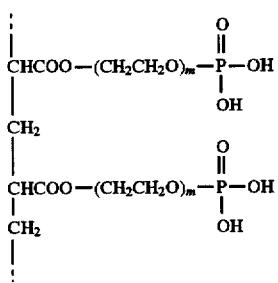

A thickness of the cathode composite of the prepared battery was 50 microns in average, 53 microns maximum and 47 microns minimum.

The initial discharge test same with the embodiment 1 was done on the prepared battery, and a cathode utilization factor of 85% was obtained. A filling rate of active material per volume of cathode composite was 35 volume percents.

In place of the compound shown in the formula (XI), a compound may be used which has a structure same with that of the formula (XI) and a molecular weight different from it.

(Embodiment 12)

A battery was made up in the same way as the embodiment 1 except that 0.75 weight part of poly-2-vinylpyridine (molecular weight: 150,000) shown by a formula (XII) functioning as the dispersant were used in place of the compound shown by the formula (I). 10 weight parts of benzene were used as the diluent.

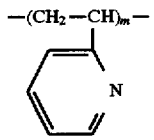
(XII)

A thickness of the cathode composite of the prepared battery was 50 microns in average, 53 microns maximum and 47 microns minimum.

The initial discharge test same with the embodiment 1 was done on the prepared battery, and a cathode utilization factor of 85% was obtained. A filling rate of active material per volume of cathode composite was 35 volume percents.

In place of the compound shown in the formula (XII), a compound which has a structure same as the formula (XII) and a molecular weight different from it within a range of 10,000 to 250,000, may be used.

COMPARISON EXAMPLE 1

A battery was made up in the same way as the embodiment 1 except that a compound functioning as the dispersant was not used.

Cohering particles of $MnO_2$ and acetylene black were formed on the cathode composite of the prepared battery, and there was a part having a thickness reaching 500 microns. A thickness of the cathode composite other than the part on which the cohering particles were formed was 61 microns in average, 72 microns maximum and 51 microns minimum.

The initial-discharge test same with the embodiment 1 was done on the prepared battery, and a cathode utilization factor of 70% was obtained. In the discharge test after preservation of 40 days at 60° C., a cathode utilization factor of 45% was obtained. A filling rate of active material per volume of cathode composite was 23 volume percents.

Figure 2:
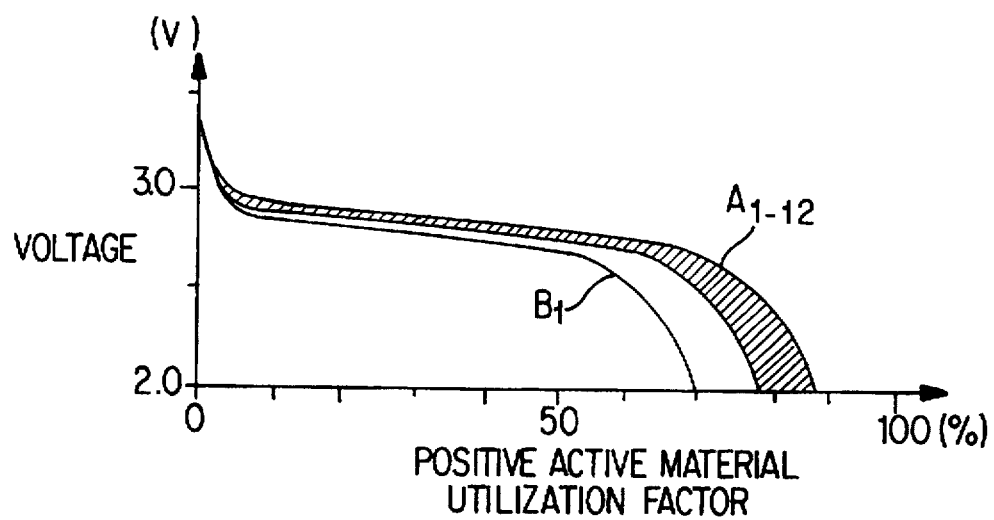
FIG. 2 is a diagram showing initial discharge characteristics of embodiments 1 through 12 and a comparison example 1.
Figure 3:
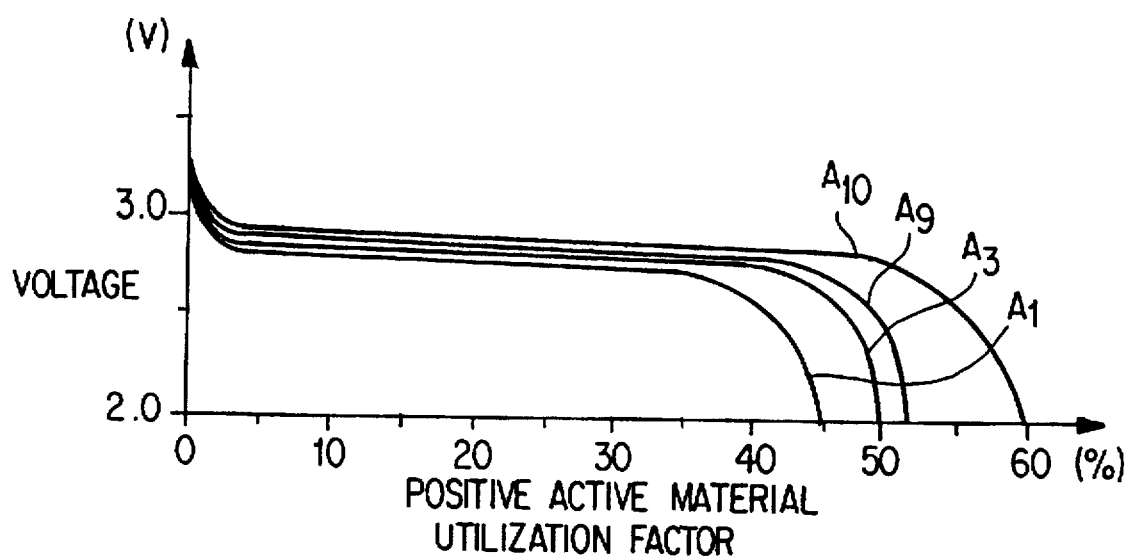
FIG. 3 is a diagram showing discharge characteristics after preservation of 40 days at 60° C. of embodiments 1, 3, 9 and 10.

FIG. 2 is a diagram showing initial discharge characteristics of the embodiments 1 through 12 and comparison example 1. In FIG. 2, $A_{1-12}$ shows the initial discharge characteristics of the embodiments 1 through 12, and $B_1$ shows the initial discharge characteristic of the comparison example 1. FIG. 3 is a diagram showing discharge characteristic after preservation of 40 days at 60° C. In FIG. 3, $A_1$ shows a discharge characteristic of the embodiment 1, $A_3$ shows that of the embodiment 3, $A_9$ shows that of the embodiment 9 and $A_{10}$ shows that of the embodiment 10, respectively.

As seen from the both diagrams, the discharge characteristics of the embodiments 1 through 12 were more excellent than that of the comparison example 1.

Figure 4:
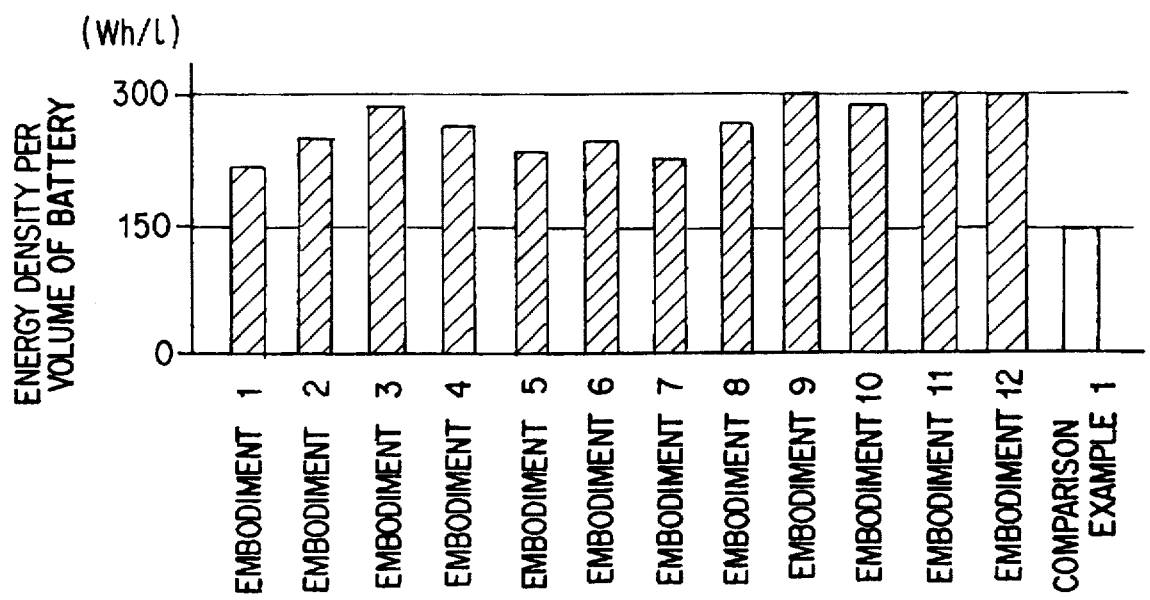
FIG. 4 is a diagram showing energy densities per volume of the batteries of embodiments 1 through 12 and comparison example 1.

FIG. 4 shows energy densities per volume of batteries of the embodiments 1 through 12 and comparison example 1. As is obvious from FIG. 4, even the energy densities per volume of batteries of the embodiments 1 through 12 were more excellent than that of the comparison example 1.

As described above, since the cathode composite for use in the primary batteries shown in embodiments 1 through 12 include compounds functioning as the dispersant, the following effects are obtainable. In the cathode composite, the positive active material and conductive agent are dispersed uniformly and the surface of sheet-shaped cathode composite becomes smooth without corrugation. As a result, the cracking, the peeling-off from the substrate and the occurrence of short-circuiting can be prevented. Further, the utilization factor of positive active material is improved so that the battery capacity can be increased and the good discharge characteristic can be exercised. Moreover, the filling density of active material per volume of cathode composite is improved so that the energy density per volume of battery can be made better.

(Embodiment 13)

15 weight parts of $LiMn_2O_4$ for serving as the positive active material for secondary battery, 1.5 weight parts of acetylene black for serving as the conductive agent, 4 weight parts of electrolyte material for serving as the binder, 0.45 weight part of compound shown in a formula (XIII) for functioning as the dispersant, 8 weight parts of organic solvent formed by mixing cyclohexanone, methylethylketone and toluene for serving as the diluent, and 0.08 weight part of azobisisobutyronitrile for serving as the reaction initiator, were mixed to prepare a paste of cathode composite. The compound shown in the formula (XIII) has an acrylic group having the reactive ethylene bonding. A mixture comprising monoacrylate of ethylene oxide, diacrylate of ethylene oxide and triacrylate of ethylene oxide was dissolved in propylene carbonate solution including lithium hexafluoro-arsenate with a concentration of 2 mol/l, so as to prepare the mentioned electrolyte material. Three kinds of acrylates forming the materials of the above mixture have molecular weights of about 200 respectively.

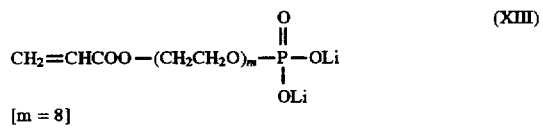
(XIII)

[m = 8]

In the next place, the prepared paste was cast on a stainless steel substrate and left as it was for 1 hour at 100° C. in an atmosphere of inert gas so as to be cured, so that a sheet-shaped cathode composite was prepared on the stainless steel substrate. A thickness of the prepared cathode composite was 53 microns in average, 55 microns maximum and 51 microns minimum.

In the third place, 0.05 weight part of azobisisobutyronitrile were dissolved in 10 weight parts of the above electrolyte material, and this solution was cast on the cathode composite and cured in the same way as above, so that an electrolyte film was formed on the cathode composite. A thickness of the prepared electrolyte film was 20 microns.

A composite sheet thus prepared comprising the stainless steel substrate, the cathode composite and the electrolyte film was cut out into a piece of 1 cm by 1 cm square. Metallic lithium having a thickness of 100 microns was attached to the electrolyte film of this composite sheet for serving as the anode so as to make up a battery having a structure shown in FIG. 1, that is, comprising a stainless steel substrate 1, a cathode composite 2, an electrolyte film 3, an anode 4 and a stainless steel substrate 5.

A load of 1 kg/cm² was applied on the prepared battery, and the charge/discharge test was done under this condition at 25° C. with a constant current of 0.1 mA/cm². As a result, an initial capacity of more than or equal to 80% was maintained even after charging and discharging of 100 cycles. A filling rate of active material per volume of cathode composite was 35 volume percents.

In place of the compound shown in the formula (XIII), a compound may be used, in which m is 1 through 7 and 9 through 80 in the formula (XIII). Further, a compound may be used, which has a methacrylic group in place of the acrylic group. Moreover, a compound having a basic structure different from that of the formula (XIII) may be used, provided that the compound includes the reactive ethylene bonding in the molecular structure which will become the polar molecule, and functions as the dispersant.

(Embodiment 14)

A battery was made up in the same way as the embodiment 13 except that 0.75 weight part of compound (molecular weight: 10,000) shown by the formula (XI) functioning as the dispersant were used in place of the compound shown by the formula (XIII). 10 weight parts of benzene were used as the diluent.

A thickness of the cathode composite of the prepared battery was 50 microns in average, 54 microns maximum and 45 microns minimum.

The charge/discharge test same with the embodiment 13 was done on the prepared battery, and a capacity of more than or equal to 80% of the initial capacity was maintained even after charging and discharging of 100 cycles. A filling rate of active material per volume of cathode composite was 35 volume percents.

In place of the compound shown in the formula (XI), a compound may be used, which has a structure same with the formula (XI) and a molecular weight different from it.

(Embodiment 15)

A battery was made up in the same way as the embodiment 13 except that 0.75 weight part of poly-4-vinylpyridine (molecular weight: 140,000) shown by a formula (XIV) functioning as the dispersant were used in place of the compound shown by the formula (XIII). 10 weight parts of benzene were used as the diluent.

(XIV)

A thickness of the cathode composite of the prepared battery was 50 microns in average, 54 microns maximum and 45 microns minimum.

The charge/discharge test same with the embodiment 13 was done on the prepared battery, and a capacity of more than or equal to 80% of the initial capacity was maintained even after charging and discharging of 100 cycles. A filling rate of active material per volume of cathode composite was 35 volume percents.

In place of the compound shown in the formula (XIV), a compound may be used, which has a structure same with the formula (XIV) and a molecular weight different from it within a range of 10,000 to 250,000.

COMPARISON EXAMPLE 2

A battery was made up in the same way as the embodiment 13 except that a compound functioning as the dispersant was not used.

Cohering particles of $LiMn_2O_4$ and acetylene black were formed on the cathode composite of the prepared battery, and there was a part having a thickness reaching 500 microns. A thickness of the cathode composite other than the part on which the cohering particles were formed was 58 microns in average, 66 microns maximum and 49 microns minimum.

The charge/discharge test same with the embodiment 13 was done on the prepared battery, and a capacity after charging and discharging of 100 cycles was smaller than or equal to 50% of the initial capacity.

Figure 5:
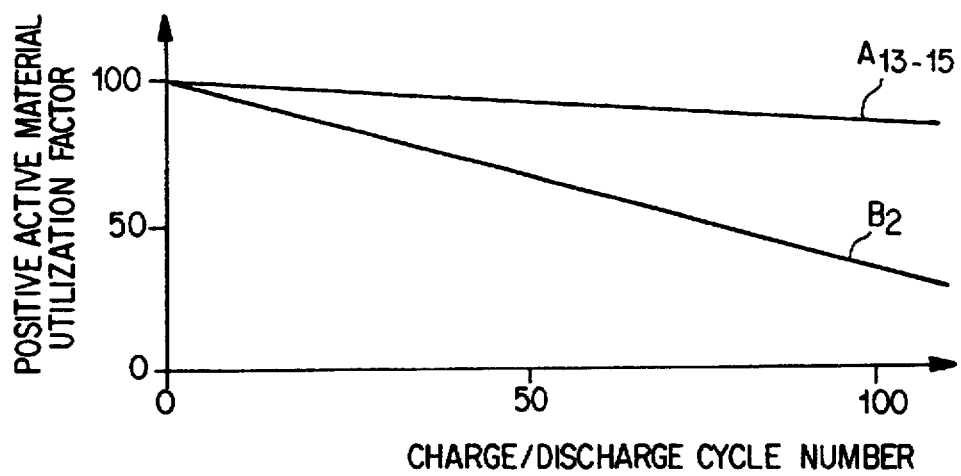
FIG. 5 is a diagram showing charge/discharge cycle characteristics of embodiments 13 through 15 and a comparison example 2.

FIG. 5 is a diagram showing charge/discharge cycle characteristics of the embodiments 13 through 15 and the comparison example 2. In FIG. 5, $A_{13-15}$, shows the charge/discharge cycle characteristics of the embodiments 13 through 15, and $B_2$ shows the charge/discharge cycle characteristic of the comparison example 2. As seen from FIG. 5, the charge/discharge cycle characteristics of the embodiments 13 through 15 are more excellent than that of the comparison example 2.

As described above, since the cathode composite for use in the secondary batteries shown in embodiments 13 through 15 include compounds functioning as the dispersant, the following effects are obtainable. In the cathode composite, the positive active material and the conductive agent are dispersed uniformly and the surface of sheet-shaped cathode composite becomes smooth without corrugation. As a result, the cracking, the peeling-off from the substrate and the occurrence of short-circuiting can be prevented. Further, the utilization factor of positive active material is improved so that the battery capacity can be increased and the good charge/discharge characteristic can be exercised. Moreover, the filling density of active material per volume of cathode composite is improved so that the energy density per volume of battery can be made batter.

INDUSTRIAL APPLICABILITY

This cathode composite can be effectively utilized for a device to make excellent a discharge characteristic of primary battery and a charge/discharge characteristic of secondary battery.

What is claimed is:

1. A cathode composite comprising (i) a polar organic molecule, (ii) a chalcogen containing positive active compound, (iii) a conductive agent, and (iv) a diluent, wherein the polar organic molecule has at least one acid structure selected from the group consisting of phosphoric acid, sulfonic acid, boric acid, carboxylic acid and sulfuric acid, and functions as a dispersant, in which said acid structure is in the form of an ammonium salt or a metallic salt.

2. A cathode composite as set forth in claim 1, in which said metallic salt is a lithium salt.

* * * * *